United States Patent [19]

Tuckey et al.

[11] Patent Number: 5,511,957

[45] Date of Patent: Apr. 30, 1996

[54] HIGH CAPACITY FUEL PUMP AND FILTER COMBINATION

[75] Inventors: Charles H. Tuckey, Cass City, Mich.; John F. Combest, Findlay, Ohio; Kirk D. Fournier, Essexville, Mich.

[73] Assignee: Walbro Corporation, Cass City, Mich.

[21] Appl. No.: 313,742

[22] Filed: Sep. 27, 1994

[51] Int. Cl.$^6$ .................................................. F04B 35/04
[52] U.S. Cl. .................. 417/313; 417/423.3; 417/423.9; 210/416.4
[58] Field of Search .............. 417/313, 423.3, 417/423.9; 210/416.4

[56] References Cited

U.S. PATENT DOCUMENTS

| | | | |
|---|---|---|---|
| 3,172,850 | 3/1965 | Englesberg et al. | 417/423.9 |
| 4,309,155 | 1/1982 | Heinz et al. | |
| 4,362,476 | 12/1982 | Kemmner et al. | |
| 4,697,995 | 10/1987 | Tuckey. | |
| 4,789,308 | 12/1988 | Tuckey. | |
| 5,096,391 | 3/1992 | Tuckey | 417/423.3 |
| 5,263,459 | 11/1993 | Talaski. | |
| 5,360,322 | 11/1994 | Heuein et al. | 417/313 |

FOREIGN PATENT DOCUMENTS 0191861  7/1990  Japan ........................... 210/416.4

Primary Examiner—Charles Freay
Attorney, Agent, or Firm—Barnes, Kisselle, Raisch, Choate, Whittemore & Hulbert

[57] ABSTRACT

In a fuel system for an internal combustion engine powering a motor vehicle, a fuel reservoir canister mounted in a main fuel tank. An annular fuel filter element is enclosed in an axially elongate housing with radially spaced apart inner and outer cylindrical side walls. The housing is received in the canister with its outer side wall bearing on and radially supported by a complementary side wall of the canister. Preferably, a fuel pump and pressure regulator are disposed in the canister preferably so they overlap with and are encircled by the filter housing. The high pressure outlet of the fuel pump is connected to the filter to supply filtered fuel to the engine at a pressure regulated and controlled by the pressure regulator.

14 Claims, 2 Drawing Sheets

5,511,957

HIGH CAPACITY FUEL PUMP AND FILTER COMBINATION

FIELD OF INVENTION

This invention relates to automotive fuel systems and more particularly to an in-tank reservoir and fuel pump module.

BACKGROUND OF THE INVENTION

In the provision of fuel to internal combustion engines, it is important that the fuel be as completely free of contaminants as is possible. This is especially true for modern fuel systems in which fuel injection through fine nozzles is accomplished. Usually, introductory fuel socks at the pump inlets are utilized but even more filtering is desirable. On the other hand, the use of fuel pump modules within the tank provides dimensional restraints particularly on the vertical or axial length and the radial width or diameter which make it difficult to increase the size of in-tank fuel pump modules.

SUMMARY OF THE INVENTION

The present invention is directed to an in-tank fuel reservoir and pump module in which a filter is provided within a canister in the form of an annular filter of efficient material. Preferably, the canister radially supports the annular housing for the filter. Preferably, a portion of a fuel pump and/or a pressure regulator is received within the annular filter and the canister. Preferably, a composite canister cap incorporates a fuel inlet and a filtered fuel outlet and carries a diaphragm and valve of the pressure regulator to regulate the outlet fuel pressure and dump excess fuel into the canister.

Objects, features and advantages of this invention are to provide a fuel reservoir and pump module which has an extremely compact construction and arrangement, a low axial or vertical height and radial width, enhanced fuel filter capacity, a filter within the module, a filter on the output side of the pump, a high pressure filter housing of light weight material, a modular design, precise regulation of the output fuel pressure even as in use the filter resistance to fuel flow increases, and is rugged, durable and of economical manufacture and assembly.

These and other objects, features and advantages of this invention will be apparent from the following detailed description, appended claims and accompanying drawings in which the details of the invention are set forth to enable those skilled in the art to practice the invention, all in connection with the best mode presently contemplated of the invention.

BRIEF DESCRIPTION OF THE DRAWINGS

Drawings accompany the disclosure and the various views thereof may be briefly described as.

DETAILED DESCRIPTION OF THE INVENTION

Figures 1, 2:
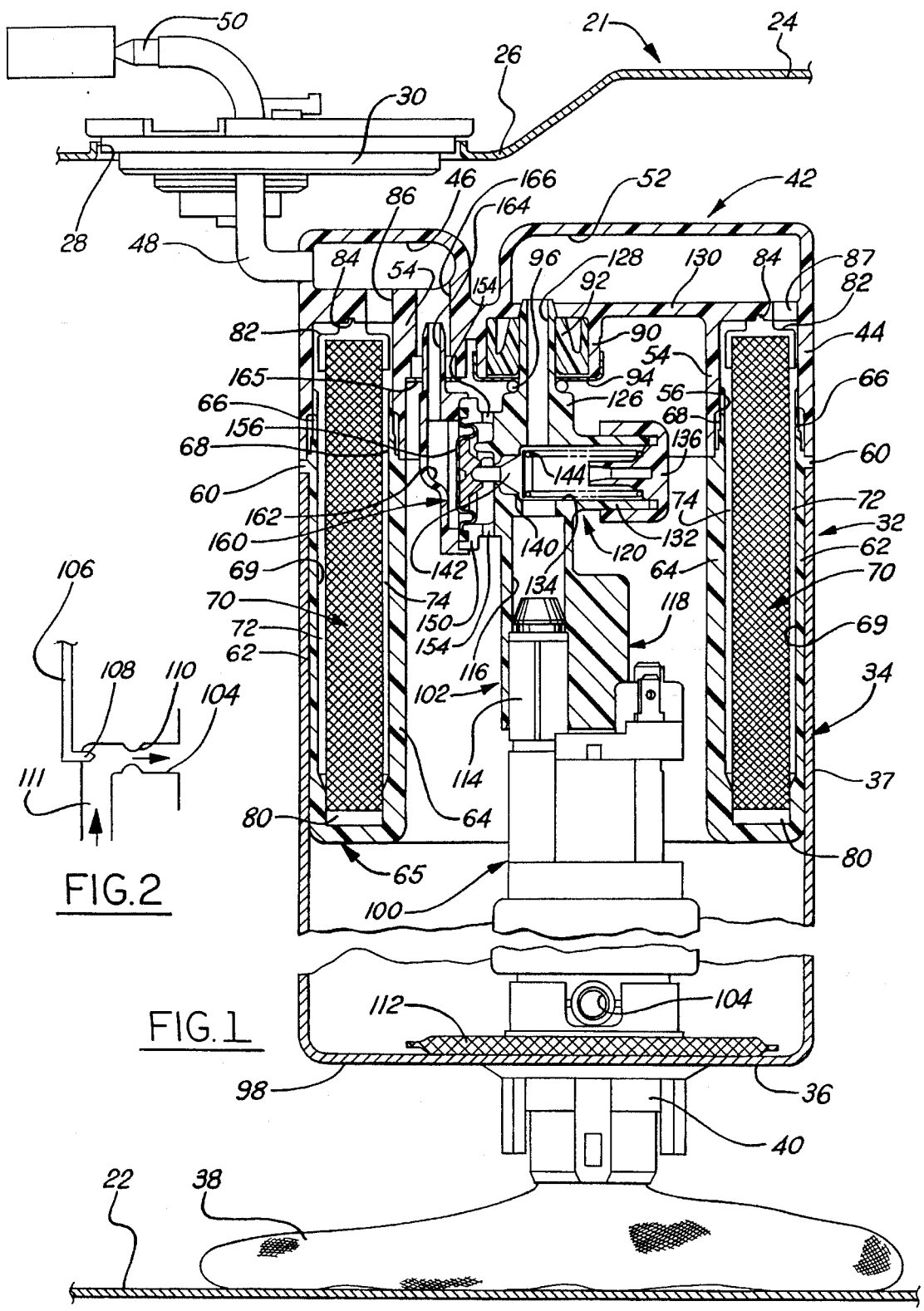
FIG. 1 is a vertical section of a fuel reservoir, pump and filter assembly embodying this invention.
FIG. 2 is a diagrammatic view of a jet pump associated with a main fuel pump.

FIG. 1 illustrates a fuel reservoir and pump module 20 embodying this invention disposed in a vehicle fuel tank 21 with a bottom panel 22 and a top panel 24 with a depressed section 26 having a circular opening 28 receiving a closure 30.

The fuel pump module 20 has a fuel canister 32 with a base vessel 34 having a bottom closure 36 and a cylindrical side wall 37. Below the canister is a sock-filter 38 and a pump fuel inlet 40. The canister is closed by a top cap 42 with a depending skirt 44 which registers with the top of the cylindrical wall 37. The cap has a filtered fuel chamber 46 opening to a fuel outlet conduit 48 which passes through the closure 30 to an engine fuel supply 50. Chamber 46 is open to an annular filter chamber 69. The cap 42 has also an "unfiltered" fuel chamber 52 associated with a pump outlet to be described.

The cap 42 has an inner skirt 54 which forms, with the outer skirt 44, an annular recess 56 extending down to the lower edge of the outer skirt 44. The spaced walls 62 and 64 of an annular filter container 65 have upward annular projections 66 and 68 of reduced thickness which interfit telescopically with the inner and outer walls 44, 54 of annular recess 56. These walls 44, 54, 62, 64 form a closed annular recess 69 which contains an annular filter element 70. These projections 66 and 68 are welded to the walls 44 and 54, forming the recess 56 so that the filter container 65 is attached by these projections 66, 68 to the cap 42. An annular rim 60 interfits between wall 44 and 62. Thus, in assembly, the filter housing will slip into the canister wall 37.

Within the filter chamber 69 is an elongate annular filter element 70 formed of porous material preferably in the form of a blown plastic material such as Acetal or a cellulose phenolic impregnated paper enhancer. The inner and outer diameters of the cylindrical filter element are such that annular flow spaces 72 and 74, respectively, are provided between the outer wall 62 and the inner wall 64 of the container 65 as will be described in connection with the operation of the module.

Preferably, the lower end of the filter element 70 is secured by a sealing material 80 to the bottom of the container 65. The top end of the filter element 70 is captured in a skirted ring 82 which has an annular top rib 84 fitting into a complementary annular groove in the lower surface of cap 42. Chamber 46 communicates with the inner flow space 74 around the inside of the filter element 70 through a port 86. The chamber 52 communicates with the outer flow space 72 around the outside of the filter element 70 through a port 87. Preferably, to accommodate the stack up of tolerances the sealant material 80 remain elastic during assembly of the filter element 70, container 65 and the cap 42.

Disposed within the canister is a fuel pump 100 and preferably a pressure regulator 102, one or both of which are, at least in part, preferably disposed within the filter container 65. If desired and where the constraints on length permit, the filter container can be axially spaced from and not overlap with the pump and/or pressure regulator. For some applications it may even be desirable to locate the pump and pressure regulator remote from the in tank filter container 65 and fuel canister 32 or reservoir.

Preferably, the fuel pump 100 has two stages, such as that shown in U.S. Pat. No. 5,263,459, with a first stage jet pump and a second stage electrically driven pump, preferably of the type described in U.S. Pat. Nos. 4,697,995 and 4,789, 308. Preferably, the first stage jet pump draws fuel from the fuel tank through the filter 38 and an inlet 40 and discharges it through an outlet 104 into the canister 34. As shown diagrammatically in FIG. 2, a small quantity of fuel is supplied by the second stage electrically driven pump through a high pressure conduit 106 to a jet 108 upstream of an orifice 110 to supply fuel to the canister. The jet pump draws fuel from the inlet 40 through a passage 111. The electrically driven second stage pump draws fuel from the canister through a filter 112 and an inlet passage (not shown), and discharges fuel at a high pressure through an outlet nipple 114 coupled to an inlet passage 116 in a housing 118 of the pressure regulator 102 which is supported on the pump housing.

The regulator has an upstanding projection 126 with an outlet passage 128 which is a continuation of the inlet passage 116 and thus of the pump outlet 114. This tubular projection 126 extends through a septum wall 130 of the cap which forms the base of the chamber 52 and is surrounded by a sealing grommet 92 received in an annular skirt in the cap and retained by an inverted cup 94 pressed into place by an O-ring 96.

The pump supplies high pressure fuel to the filter 70 and the pressure of the filtered fuel supplied to the outlet chamber 46 is regulated and controlled by a valve 142 actuated by a diaphragm 156 of the pressure regulator.

Figure 3:
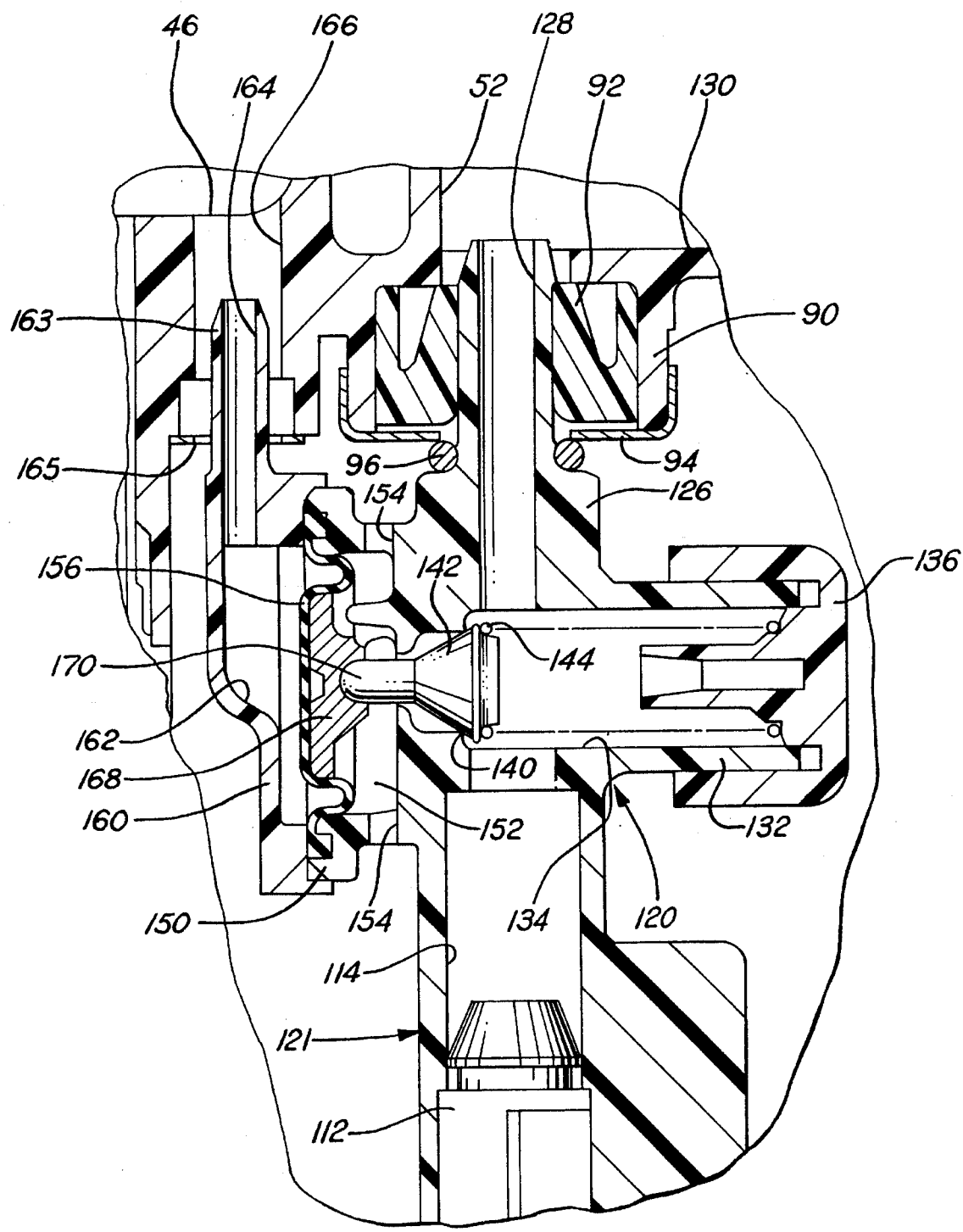
FIG. 3 is an enlarged view of a pressure regulator shown in FIG. 1.

As shown in FIG. 3, between the portions of the regulator housing 118 forming passages 114 and 128 is a transversely extending hollow projection 132 with a bore 134 closed by a cap 136. A valve seat 140 at the left end of bore 134 is formed to cooperate with the valve 142 backed by a spring 144. The right end of the spring is seated on the interior of the cap 136 which can be adjustably positioned, if desired to vary the pressure of the fuel in outlet chamber 46.

At the left side of housing 118 (FIGS. 1 and 3) is an annular extension 150 which forms a diaphragm chamber 152 which opens at the top and bottom through ports 154 to the canister. A diaphragm 156 having a periphery suitably captured in grooves in annular extension 150 is clamped and sealed in place by an annular ring housing 160 with a chamber 162 to allow diaphragm movement. A tubular projection 163 forms a passage 164 in housing 160 which passage extends into a port 166 open to chamber 46 carrying filtered fuel to outlet passage 48. A washer seal 165 surrounds and seals tubular projection 163 from the interior of the canister. The diaphragm 156 is backed centrally by a small plate 168 having a central recess to receive a rounded projection 170 formed at the diaphragm end of valve 142. Housing 160 is suitably affixed to annular extension 150 (by means not shown) to clamp and seal the periphery of the diaphragm 156 in place.

Operation of the Pump-Filter Assembly

With reference to the drawings and the above description, it will be understood that the main fuel tank 21 will contain liquid fuel, and operation of the pump 100 when an engine is started, will pull fuel through filters 38 and 112 into the pump. The jet pump first stage will direct fuel into the canister through outlet 104. The second stage electric fuel plump will direct high pressure fuel through outlet 114 to passages 116 and 128 in housing 118 to chamber 52 where it will pass through port 87 to the outside of the annular cylindrical filter element 70 through flow space 72. Unfiltered fuel will flow down and around the filter in the outer space 72 and then flow radially inwardly through the annular filter 70 to the inner flow space 74. The filtered fuel will then pass upwardly in flow space 74 through the outlet port 86 and into chamber 46 and thence to conduits 48 and 50 to the engine.

The valve 142 is urged toward the seat 140 by spring 144 but outlet fuel pressure in chamber 46 acts on the diaphragm 156 through passages 166 and 164 and the chamber 162. At a predetermined pressure, the diaphragm 156 will move to the right to move valve 142 off its seat 140. This will dump "unfiltered" outlet fuel from the pump 100 to the canister through ports 154. Thus, this valve 142 regulates the pump outlet pressure to maintain a constant pressure at the outlet side of the filter. The regulator valve has no control over the pump pulling fuel from the canister. This valve functions to sense and maintain constant pressure downstream of the filter element 70 by bleeding or by-passing fuel from the pump outlet 114 into the canister.

While efficient filter material is frequently low in mechanical strength, the present design allows the use of such material. First of all, the filter capacity can be altered by controlling the axial length of the filter and containment in the canister and, this may be accomplished without increasing the overall length of the pump-canister module. Secondly, the filter housing 65 itself receives radial support on the outer side of the wall 62 by the wall 37 of the fuel canister itself. Thus, the outer filter housing wall 62 can be relatively thin. Due to its "hoop" strength the inner wall 64 can also be relatively thin while still providing the necessary strength. The end walls of the filter housing 65 are small in cross-sectional area and can be readily supported and sealed by the filter housing side walls 62, 64. The annular design allows the pump and/or pressure regulator to be surrounded without significantly enlarging the overall canister dimensions.

Thirdly, the annular filter provides a relatively large filter capacity and area, with a minimum decrease of the volume or capacity of the canister 32 for retaining fuel which significantly contributes to a compact reservoir and fuel pump module. Sufficient canister fuel volume must be maintained to prevent the pump from sucking air when the vehicle is turning a corner or otherwise inclined from its normal level road attitude particularly when the fuel tank is nearly empty. This usually requires a fuel reservoir volume of the canister of at least about 0.7 of a liter.

Fourthly, the filter 70 is more efficient and far less likely to become sufficiently clogged or plugged to prevent the supplying of sufficient fuel to the engine because it is connected to the output side of the fuel pump 100.

Fifthly, the fuel to be filtered will flow into the annular filter at the top, move down and radially inwardly and then exit again at the top. Thus, any dirt or debris may move to the bottom of the filter and not be disturbed by the fuel moving through the filter element 70.

What is claimed is:

1. A fuel module for furnishing fuel to an engine which comprises:

(a) a canister for receiving liquid fuel therein, (b) an annular housing disposed in said canister and for enclosing a filter element and having an inlet and an outlet, (c) an annular fuel filter element disposed in said annular housing, and (d) an electric fuel pump having a fuel inlet and a fuel outlet communicating with said inlet of said annular housing to pass fuel through said filter element and supply filtered fuel through said outlet of said annular housing to an engine.

2. A fuel module as defined in claim 1 in which:

(a) said annular housing confining said annular filter comprises a double-walled container having a deep annular recess with means at the top and bottom ends of said container for sealing ends of said annular filter element within said recess, (b) a main fuel tank for location in a vehicle, (c) said canister is supported in said tank, (d) said fuel pump is in said canister, and (e) said annular housing overlaps and encircles said fuel pump.

3. A fuel module as defined in claim 2 in which said canister comprises a deep cup retainer with an open top edge, a cap having a depending skirt with a lower edge to register with said top edge, and said container is carried by said cap and bears on said depending skirt.

4. A fuel module as defined in claim 3 in which said cap has a first fuel inlet chamber to receive fuel from said pump outlet, and a second separate filtered fuel chamber for receiving filtered fuel going to an engine, said first fuel chamber being in communication with an outer flow space surrounding the outer periphery of said filter, and said second fuel chamber being in communication with an inner fuel flow space surrounding the inner periphery of said filter to receive filtered fuel.

5. A fuel module as defined in claim 2 in which the double-walled container has inner and outer side walls and the outer side wall bears on and receives radial support from a surrounding wall of said canister.

6. A fuel system for furnishing fuel to an engine which comprises:

(a) an electric fuel pump having an inlet and an outlet, (b) an annular filter element disposed about a central axis, (c) an annular housing confining said annular filter on the outer and inner peripheries of said filter, said housing providing flow spaces on the inner and outer peripheries of said filter, (d) means connecting one of the inner and outer flow spaces with the outlet of said fuel pump, and (e) means connecting the other of the inner and outer flow spaces with a fuel outlet leading to the engine, whereby pump outlet fuel will flow into one of said inner and outer flow spaces, around said filter, generally radially to the other of said inner and outer flow spaces and to said filter outlet.

7. A fuel system as defined in claim 6 which also comprises:

(a) said annular housing having a double-walled container having a deep annular recess with means at the top and bottom ends of said container for sealing ends of said annular filter element within said recess, (b) a main fuel tank for location in a vehicle, (c) a fuel canister supported in said tank, (d) said fuel pump is in said canister, and (e) said annular housing overlaps and encircles said fuel pump.

8. A fuel system as defined in claim 7 in which said canister comprises a deep cup retainer with an open top edge, a cap having a depending skirt with a lower edge to register with said top edge, said container having an external radial flange captured between said top edge and said lower edge to support said container in said canister.

9. A fuel system as defined in claim 8 in which said cap has a first fuel inlet chamber to receive fuel from said pump outlet, and a second separate filtered fuel chamber for receiving filtered fuel going to an engine, said first fuel chamber being in communication with said outer flow space of said filter, and said second fuel chamber being in communication with said inner fuel flow space of said filter to receive filtered fuel.

10. A fuel system as defined in claim 9 in which sealing means at the top end of said annular filter is associated with said cap in sealing relation to isolate said outer flow space of said annular filter from said inner flow space at the top end of said filter.

11. A fuel system as defined in claim 7 in which said container is formed with a bottom recess to receive and close the bottom end of said filter and isolate said outer flow space from said inner flow space at the bottom of said filter.

12. A fuel system as defined in claim 8 in which said container has upper spaced annular edges telescoped into an annular recess in the lower end of said cap to form the inner and outer flow spaces around said filter.

13. A fuel system as defined in claim 7 in which said double-walled container has inner and outer side walls and the outer side wall is positioned against and receives radial support from an encircling side wall of said canister.

14. A fuel system for furnishing fuel to an engine which comprises:

(a) a fuel tank for receiving liquid fuel, (b) a canister for receiving liquid fuel therein, said canister being disposed in said fuel tank, (c) an annular housing disposed in said canister and for enclosing a filter element and having an inlet and an outlet, and (d) an annular fuel filter element disposed in said annular housing, and said canister having a side wall encircling and radially supporting said annular housing.

\* \* \* \* \*